Feb. 22, 1949.　　　　　H. C. SPICER　　　　　2,462,140
PORTABLE BATTERY-POWERED GAMMA RAY COUNTING
RATE METER OF HIGH SENSITIVITY
Filed Nov. 21, 1945
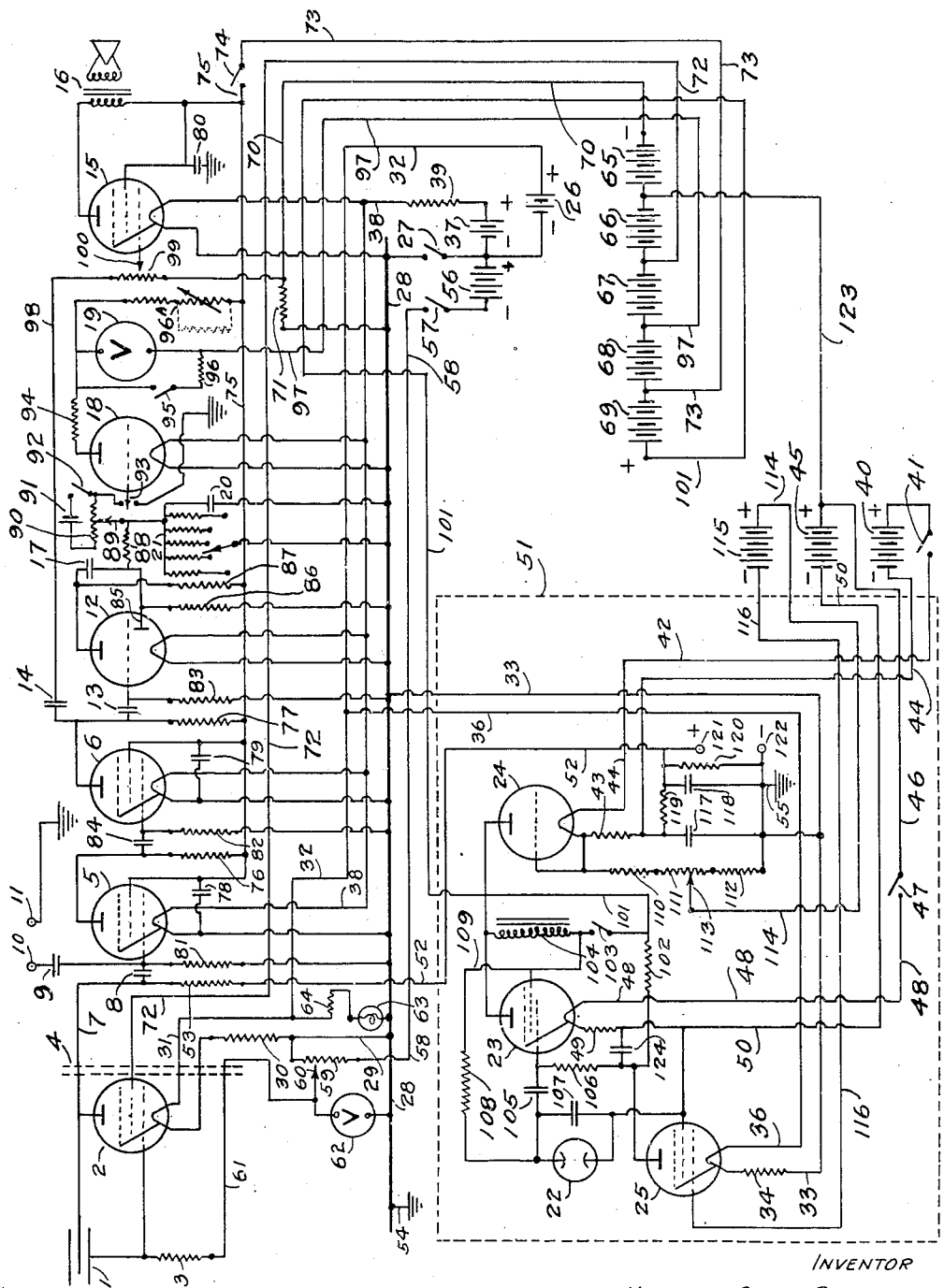
INVENTOR
HERBERT CECIL SPICER
By J. F. Morkushead
ATTORNEY Patented Feb. 22, 1949

2,462,140

UNITED STATES PATENT OFFICE 2,462,140

PORTABLE BATTERY-POWERED GAMMA-RAY COUNTING RATE METER OF HIGH SENSITIVITY

Herbert Cecil Spicer, Takoma Park, Md.

Application November 21, 1945, Serial No. 630,102

6 Claims. (Cl. 250—83.6)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to apparatus for detecting the presence of ionizing rays or particles and for measuring the relative quantum thereof and counting the number of such rays or particles impinging upon a tube of relatively small size. More particularly, this invention relates to highly portable, extremely sensitive apparatus for detecting the presence of gamma rays and the migration of submicroscopic particles such as electrons and neutrons having velocities sufficient to initiate ionization when penetrating a medium easily ionized.

Portable instruments have heretofore been described or proposed for the detection and location of radium and radio-active materials, but in general they lacked the sensitivity or stability to measure the less intense gamma ray sources that are frequently encountered in prospecting for ores that are very weakly radio-active or are overburdened with considerable non-radio-active or absorptive material.

The principal object of this invention is to provide a compact, light-weight portable instrument of extremely high sensitivity to detect gamma ray emanations and the like from weakly radio-active sources. Another object of this invention is to make available a device capable of recording gamma rays of extremely low intensity. Still another object of this invention is to provide an instrument having variable ranges which make its use possible with weak or intense radioactive sources.

The present invention may be used to locate pitchblende carnotite, autunite, and other uranium-bearing ores such as uranium-bearing vanadiferous deposits. The gamma rays emanating through the soil and rock from such deposits may be measured, and the present invention may be used to locate the vein deposits of such material and in general to detect the presence of small amounts of radio-active material by the gamma ray emanations.

Other uses for the device in addition to prospecting for ores and minerals containing radioactive materials and for determining the amount of radio-active materials present in terms of one of its radio-active components, are to locate lost radium capsules and piles used in production of the element plutonium.

The invention may be more readily understood by reference to the accompanying drawing which shows a circuit diagram of the apparatus comprising the invention.

In the drawing a Geiger-Mueller counter-tube is shown at 1. The cylindrical conductor of the Geiger-Mueller tube is connected to the control grid of the pentode amplifier tube 2. The axial conductor of the tube 1 is connected to the anode of the pentode 2. Parts 1 and 2 comprising the counter and pre-amplifier tubes and the extinction resistor 3, connected to the cylindrical conductor of tube 1, are enclosed in an aluminum conductor shown diagrammatically at 4. The connections between the counter tube 1, the pentode 2, and the resistor 3 are short and direct. Parts 1, 2, and 3 incased in the aluminum conductor 4 constitute essentially a Neher-Harper counter pre-amplifier assembly, as disclosed at pages 940–943 of the Physical Review, 49—12 (1936).

Connections from the pre-amplifier assembly may be made to the amplifier stages and the sources of potential for energizing the pre-amplifier assembly by flexible shielded cable terminating in a Jones plug for connection to the amplifier unit, or in certain cases it may be desirable to mount the complete apparatus in a single housing. The pre-amplifier output is fed to a 2-stage resistance-coupled amplifier including the high-gain pentodes 5 and 6. The anode of the tube 2 is connected by way of the conductor 7 to one terminal of the condenser 8, the other terminal of which is connected to the control grid of the pentode 5. The control grid of the pentode 5 is also connected to one terminal of a condenser 9, the other terminal of which is connected to a binding post 10. Adjacent to the binding post 10 is a second binding post 11 which is grounded. The purpose of the binding posts 10 and 11 will be subsequently described.

The two-stage resistance-coupled amplifier, including pentodes 5 and 6, has its output connected to the input circuit of a triode 12 which acts as a pulse leveler. The voltage pulse from the amplifier 6 is fed by way of a coupling condenser 13 to the grid of the high mu triode 12. Another coupling condenser 14 is connected between the anode of the pentode 6 and the control grid of a pentode 15 forming a part of a power amplifier. The output of the power amplifier tube 15 is connected to a midget permo-dynamic speaker 16 to record the pulses received. An impulse register having suitable characteristics may be substituted for the speaker. The output of the triode 12, is transferred by way of the condenser 17 to a vacuum tube voltmeter comprising a diode rectifier built into the envelope of the triode 12 and the triode 18. A microammeter 19 is connected in the anode circuit of the triode 18. This microammeter 19 is calibrated to read in terms of the voltage impressed on the tank condenser 20, normally connected between the control grid and cathode of the triode 18 and forming a part of the vacuum tube voltmeter. A variable resistance 21 is connected in shunt with the condenser 20 to provide an adjustable leak value to provide a condenser resistance time constant suitable for measuring the rates of the pulses received per unit of time.

Batteries, such as dry batteries, or light portable storage batteries, supply voltage for the instrument. High voltage to operate the counter tube and the pre-amplifier is derived from batteries through the instrumentality of an oscillating neon glow lamp 22 operating in conjunction with an interrupter pentode 23, a rectifier employing a triode operating as a diode 24, and a pentode regulator tube 25 comprising a high-voltage supply shown in the dotted shielding rectangle 51 to be more particularly described hereinafter.

Potential is applied to the cathode heaters or filaments of the various thermionic tubes employed as follows:

Battery 26 energizes the cathode of pentode 2 via the switch 27, in closed circuit position, conductors 28 and 29, resistor 30, the filament or heater of pentode 2 and the conductors 31 and 32 to battery 26. The battery 26 also energizes the cathode of pentode 25 via the switch 27, conductors 28 and 33, resistor 34, the filament or heater of pentode 25, conductor 36 and conductor 32 back to the battery 26.

Battery 37 energizes the cathodes of tubes 5, 6, 12, 15, and 18 via switch 27, conductor 28, the filaments or heaters of the various tubes, conductor 38, resistor 39, and thence back to the battery 37.

Battery 40 energizes the cathode of tube 24 via the switch 41, in closed circuit position, conductor 42, filament or heater of tube 24, resistor 43, and conductor 44 back to battery 40.

Battery 45 energizes the cathode of tube 23 via the conductor 46, switch 47, in closed circuit position, conductor 48, filament or the heaters of tube 23, resistor 49, and conductor 50 back to the battery 45.

Potential is supplied to the anode of pentode 2 and to the center conductor of the counter tube 1 from the high voltage supply tube 51 via the conductor 52, resistor 53, and conductor 7. The anode current in pentode 2 returns via the cathode of the tube through resistor 30, conductors 28 and 29 to ground at 54 from whence it returns to the ground of the high voltage supply at 55.

The control grid of the pentode 2 is biased negatively by battery 56. This battery has its positive terminal connected to the grounded lead 28 and its negative terminal connected via switch 57, in closed circuit position, to conductor 58. A potentiometer resistor 59 is connected between conductors 28 and 58. A potentiometer slider 60 is arranged to slide over resistor 59 and make electrical contact therewith at any desired position. The slider 60 is connected by conductor 61 and resistor 3 to the control grid of pentode 2 and the cylindrical conductor of the counter tube 1. A voltmeter 62 is connected between the slider 60 and conductor 28 to indicate the voltage bias deriving from battery 56 that is applied to the control grid of pentode 2. A pilot light 63 connected in series with a resistor 64 is connected across conductors 28 and 32 to indicate when the cathode of pentode 2 is energized.

A multi-tapped source of "B" potential is provided by batteries 65 to 69, inclusive, connected in series. The negative terminal of the series connected battery is connected via conductor 70 and resistor 71 to the grounded conductor 28, which as previously described, is electrically connected to the filaments or cathodes of tubes 2, 5, 6, 12, 15, 18, and 25.

Potential is applied to the screen grid of pentode 2 from batteries 65 and 66 via conductor 72. Potential is applied to the anode and screen electrodes of pentodes 5, 6, and 15 from batteries 65 to 68, inclusive, via conductor 73, switch 74, and conductor 75. The anodes of pentodes 5, 6, and 15 are connected respectively via resistors 76 and 77 and primary coil of the speaker transformer shown at 16 to conductor 75, while the screen electrodes of these tubes are connected directly to conductor 75. The screens of pentodes 5, 6, and 15 are grounded insofar as high frequency alternating currents are concerned by condensers 78 to 80, respectively, connecting said screens to ground.

The control grids of pentodes 5 and 6 and of triode 12 are connected to the grounded conductor 28 by resistors 81 to 83, respectively. The anode of pentode 5 is coupled to the control grid of pentode 6 by condenser 84.

The anode of triode 12 is coupled by condenser 17 to the anode 85 of the diode enclosed in the same envelope. The anode of triode 12 is connected via resistance 87 to the conductor 75, which in turn, is connected to the source "B" potential as previously described. The diode anode 85 is also connected via resistor 86 to the grounded conductor 28.

The diode anode 85 is connected via resistor 88 to the ungrounded terminal of the RC tank circuit comprising variable resistor 21 and the condenser 20, and to the potentiometer slider 89. The slider 89 contacts with resistor 90 which may be connected across the battery 91 by switch 92. The control grid of triode 18 may be alternatively grounded or connected to the resistor 90.

The anode of triode 18 is connected via resistance 94 to one terminal of the switch 95, to one terminal of the microammeter 19 and to the end of the resistor 96A opposite to the end connected to conductor 75. The remaining terminal of the switch 95 is connected to the remaining terminal of the microammeter 19 via the resistance 96 and this same terminal of microammeter 19 is connected via conductor 97 to the positive terminal of battery 67.

The condenser 14 having one terminal connected to the anode of pentode 6 has its remaining terminal connected via conductor 98 and potentiometer resistor 99 to conductor 70 leading to the negative pole of the "B" battery as previously set forth. The control grid of pentode 15 is connected to potentiometer slider 100 contacting resistor 99.

The high voltage supply included within the shield 51 has the cathodes of the tubes therein energized by the batteries as previously described. A positive potential of approximately 157½ volts with respect to ground is supplied to the high voltage supply from batteries 65 to 69, inclusive, via conductor 101. The anode of pentode 25 is connected to conductor 101 via resistor 102. The anodes of tubes 23 and 24 are connected together and both are connected to conductor 101 via inductance 104 and switch 103. The control grid of pentode 23 is coupled via condenser 105 to one terminal of the neon glow lamp 22. This control grid is also connected via resistor 106 to the junction between the anode of pentode 25 and the resistor 102. A condenser 107 is connected in shunt with the neon glow lamp 22 which is connected between the screen grid of pentode 22 and one terminal of resistor 108. The remaining terminal of resistor 108 is connected via conductor 109 to the screen grid of pentode 23 and to the junction between switch 103 and inductance 104.

Resistors 110—112 are connected in series between the cathode of rectifier tube 24 and ground at 55. A potentiometer slider 113 in contact with a selected point on resistor 111 is connected via conductor 114 to the positive terminal of battery 115. The negative terminal of battery 115 is connected via conductor 116 to the control grid of pentode 25. A condenser 117 is connected between ground at 55 and the junction between resistor 43 and conductor 44. A condenser 118 is connected between ground at 55 and one terminal of resistor 119, the other terminal of which resistor is connected to the ungrounded side of condenser 117. A resistor 120 is connected in shunt with condenser 118, one terminal of which condenser is grounded and the other terminal of which is connected to conductor 52 comprising the high voltage anode potential lead for counter tube 1 and pre-amplifier tube 2, as already described.

Binding post or jack contacts 121 and 122 connected respectively with conductor 52 and ground 55 are provided for facilitating the connection of a voltmeter for ascertaining the voltage delivered by the high voltage power supply 51. A conductor 123 is connected from battery 45 to battery 65 to provide an anode current return for pentode 23. A condenser 124 is connected between conductor 50 and a point between resistors 102 and 106.

In the foregoing, the circuit connections have been described. Next, the types of apparatus employed in a preferred embodiment and parameters of the units used will be discussed.

The Geiger-Mueller tube 1 is a low-pressure, gas-filled tube including argon and oxygen gas, the cylindrical tube being about 11 inches long and one-half inch in diameter internally, with slightly less than the one-fourth inch space between it and the central conductor extending through the same. Counter tubes manufactured by the Herbach and Rademan Company of Philadelphia, and other tubes of this same general description will work satisfactorily.

The vacuum tube 2 is of the type 1E5GP. The tubes 5 and 6 are of the type 1N5GT. The tube 12 is of the type 1H5GT. The tube 18 is of the type 1E4G or alternatively 1G4G. It is to be understood, however, that when a 1G4G tube is employed, the resistor 96A must be varied in value to accommodate the change. The tube 15 is of the type 1A5GT. The tube 23 is of the tube 1E5GP. The tube 24 is a 1H4G, while the tube 25 is a 1E5GP type. The neon tube 22 is of the low-current, low-voltage type having a threshold potential of something less than 65 volts with an extinction potential somewhat below its threshold potential.

The resistors included in the cathode heating circuits of the tubes for the voltages hereinafter specified are as follows:

The resistor 30 has 18 ohms resistance.
The resistor 39 has 12 ohms resistance.
The resistor 34 has 16 ohms resistance.
The resistor 49 has 16 ohms resistance.
The resistor 43 has 16 ohms resistance.

The sources of a potential at 26, 37, 40, and 45 are 3-volt sources.

The extinction resistor 3 has 10 megohms resistance. The potentiometer resistor 59 has 100,000 ohms resistance. The coupling resistor 53 has 2 megohms resistance. The coupling resistor 81 has 1 megohm resistance. The coupling resistor 76 has 0.1 megohm resistance. The coupling resistor 82 has 1 megohm resistance. The coupling resistor 77 has 0.1 megohm resistance. The coupling resistor 83 has 2 megohms resistance. The resistor 86 has 50 megohms resistance. The resistor 87 has 0.5 megohm resistance. The resistor 88 has 1 megohm resistance. The potentiometer resistor 90 has 500,000 ohms resistance. The RC tank circuit resistance 21 can be adjustably set to values of 0.1, 2, 4.5, 8, and 25 megohms. The resistor 94 has 5,000 ohms resistance. The resistor 96A has 65,000 ohms resistance made up of two units of 15 and 50,000 ohms. It is to be understood, however, that when a different tube is substituted for the tube 18 these values may have to be changed. The resistor 96 is a 1 milliampere shunt for microammeter 19. The resistor 99 has 500,000 ohms resistance. The resistor 71 has 940 ohms resistance. The resistor 108 has 0.5 megohm resistance. The resistor 106 has 0.1 megohm resistance. The resistor 102 has 2 megohms resistance. The resistor 110 has 100 megohms resistance. The resistor 111 has 1.5 megohms resistance. The resistor 112 has 1 megohm resistance. The resistor 120 has 40 megohms resistance.

The coupling condensers 8, 84, and 13 each have 50 micromicrofarads capacity. The condenser 9 has .002 microfarad capacity. The condensers 78 and 79 each have a capacity of .05 microfarad. The condenser 14 has a capacity of 50 micromicrofarads. The condenser 17 has a capacity of .008 microfarad. The condensers 20 and 80 each have a capacity of 8 microfarads. The condenser 107 has a capacity of .006 microfarad. The condenser 105 has a capacity of .001 microfarad. The condenser 124 has a capacity of 0.1 microfarad. The condensers 117 and 118 each have a capacity of 0.1 microfarad.

The "B" batteries 65, 66, 67, and 68 are blocks having 22½ volts per block. The "B" battery 69 has approximately 67½ volts output so that the voltages on the conductors leading from the "B" batteries are substantially as follows: Omitting the drop through resistance 71, conductor 70 is at substantially ground potential. Conductor 123 is at substantially 22½ volts plus above-ground potential. Conductor 72 is 45 volts plus above-ground potential. Conductor 97 is 67½ volts plus above-ground potential. Conductor 73 is 90 volts plus above-ground potential. Conductor 101 is 157½ volts plus above-ground potential. The sources of "C" potential at 56 and 115 are respectively —6 and —22½ volts.

The inductance 104, in the embodiment of this invention that was actually constructed, consisted of the primary and secondary windings of a United Transformer Company type A-16 audio-transformer having a turn ratio of 2:1 connected in series aiding. This inductance had approximately 100,000 ohms impedance at audio frequencies.

The dimensions and parameters set forth above are by way of illustration only. It is to be understood that the principles disclosed may be employed with apparatus of different type as for instance a "vest pocket" sized instrument may be made up employing microtubes of the general type of those understood to be used in artillery shell proximity fuses. The counter tube 1 may be made considerably smaller than the dimensions given above, the batteries may be made similar to the batteries used in radio-meteorograph work or even smaller and inner ear or other types of headphones may be substituted for the loudspeaker.

The device operates as follows:

The passage of an ionizing particle or ray through the counter tube 1 produces ionization of the gas therein and the migrating positively-charged ions drawn to the cylindrical conductor of the tube 1 sets up positive charges thereon that are conducted to the control grid of pentode 2 causing it to be driven less negative. The control grid of pentode 2 is normally kept at a negative bias of about 4½ volts just below cutoff by means of resistor 3 and variable potentiometer 59—60 which is supplied by "C" battery 56 of 6 volts, and the applied voltage bias is indicated on voltmeter 62.

When the control grid of pentode 2 becomes more positive, an anode current flows in this pentode with a drop of potential across resistor 53. This voltage drop together with the voltage drop occurring across resistor 3, caused by any current flow through counter tube 1, stops the discharge in the counter tube. The positive charge on the cylindrical conductor of counter tube 1 is dissipated by leakage through grid resistor 3 and by capture of electrons by the control grid of pentode 2. Thus, the original conditions existing in the counter type circuit are restored after each ionization produced therein.

The high voltage supplied to counter tube 1 and preamplifier 2 is generated, regulated, rectified, and filtered by tubes 22—25 along with their batteries and associated components. Neon tube 22 with capacitor 107 supplied with 135 volts from batteries 66—69 via conductors 101, 109 and 123 through resistor 108 is a relaxation oscillator connected to the control grid of pentode 23 through capacitor 105. Grid resistor 106 and capacitor 124 allow charges to dissipate from the grid. Voltages for the anode and screen grid of pentode 23 of 135 volts are supplied from batteries 66—69 through switch 103 after the filaments are heated. This is done to control oscillation in the tube 23. Filament voltage of two volts is supplied to tube 23 by battery 45 of 3 volts through series dropping resistor 49.

Pentode 25 regulates the control grid bias voltage to pentode 23 through resistor 106 from plate voltage changes in pentode 25. Plate voltage of 157½ volts for the tube 25 is supplied by batteries 65—69 through resistor 102. Screen grid voltage of 22½ volts is supplied to the screen grid of pentode 25 by battery 65 via conductor 123 and the filament circuit of tube 23. Filament voltage of 2 volts is provided by battery 26 through series dropping resistor 34. The control grid of pentode 25 is biased negatively with 22½ volts of battery 15. Negative voltage pulses from the oscillating neon tube 22 drive the control grid of pentode 23 past cutoff and develop a high voltage positive pulse in inductance 104.

The pulses from inductance 104 are conducted to the anode or plate of triode 24 connected as a diode, where they are rectified and fed into the capacitor-resistor filter network 117—120. The voltage builds up in capacitor 117 until it reaches the peak value of the pulses generated in inductance 104. The ripple voltage is smoothed out by resistor 119, capacitor 118, and bleeder resistor 120. The filament of tube 24 is operated by battery 40 of 3 volts after being dropped to 2 volts by resistor 43.

Voltage divider 110—112 is connected across the output voltage and a manually variable voltage supplied via potentiometer slider 113 is fed back to the control grid of pentode 25 to further stabilize the output voltage. By impressing a component of the voltage variation in the output voltage on to the control grid of the regulator tube 25 in addition to the bias voltage derived from battery 115 a considerable increase is obtained in output voltage stabilization. By the proper choice of the ratio of resistors 110 and 112 the output voltage can be varied from 400 to 1500 volts. In a typical operation of this equipment the high voltage was adjusted to give 800 volts across the counter tube, although this voltage in the embodiment disclosed could be varied from 700 to 1500 volts.

The voltage drop developed in resistor 53 due to current flow therein incident to ionization occurring in counter tube 1 and the consequent raising of the potential of the control grid of pentode 2 causes a negative potential to be impressed upon the control grid of pentode 5 via capacitor 8, driving pentode 5 toward cutoff. The plate voltage of pentode 5 supplied through resistor 76 thereupon increases due to the diminishing drop across resistor 76 and a positive voltage pulse is impressed on the control grid of pentode 6 by capacitor 84 causing more plate current to flow through the anode circuit of this tube including resistor 77. The increase of current flow in resistor 77 causes the control grid of triode 12 to be driven more negative via capacitor 13 causing cutoff of anode current in the triode section of tube 12. Output pulses from tube 12 will then be of uniform amplitude.

Pulses developed in plate resistor 87 are impressed by capacitor 17 on the diode plate 85 of tube 12. Resistor 88 and capacitor 20 form a filter and the capacitor 20 stores the direct current transmitted from the diode 85. Resistor 21 with its tap switch permits the selection of any one of several values of leak resistance to be used across tank circuit 20 to change the time constant of the CR circuit. Furthermore, each component of leak resistor 21 may be made up of a potentiometer and fixed resistor so that each may be varied to give a full scale deflection of the meter 19 of a certain amount for each range.

Battery 91, potentiometer 89—90, and switch 93 are used to balance out the no-signal potential of approximately 1 volt developed by the diode section 85 of tube 12. Switch 93 permits the control grid of triode 18 of the amplifier section of the vacuum tube voltmeter to be connected to zero bias for adjustment of the circuit resistor 96A so that the microammeter 19 reads 0, or this switch 93 permits the grid of tube 18 to be connected to the diode potential bucking battery 91 and to the diode 85.

The plate of tube 18 is connected to the 67½ volt tap of battery 65—67 through resistor 94 and the 0–300 microammeter 19. A bucking voltage is connected to this same plate through resistors 94 and 96A from the 90-volt tap on battery 65—68. The current flowing in this latter circuit is adjustable by resistor 96A which may include a potentiometer. Resistor 96 is a 1-milliampere shunt for meter 19 and is placed into or out of the circuit by switch 95. This shunt is provided for protection from overload of the meter 19 while the filament of tube 18 is heating.

Triode 18 is operated at zero bias so that at this grid potential it is operating well up on the grid voltage plate current characteristic curve and in the region where it is linear. Additional grid bias reduces the plate current and increases the bucking circuit current so that the meter current increases will increase in pulses received in the CR tank circuit 20—21. Also, tube 18 operates downward on its grid voltage plate current characteristic curve in a selected linear portion.

Calibration of the output meter 19 in terms of pulses received may be accomplished by connecting a source of uniform voltage pulses to binding posts 10 and 11, thus impressing pulses on the input circuit of amplifier 5 by capacitor 9.

In addition to supplying voltage pulses for the vacuum tube voltmeter circuit as previously described, pentode 6 also supplies pulses to the control grid of power pentode 15 via capacitor 14, conductor 98, potentiometer resistor 99, and slider 100. These pulses control the anode or plate current flowing in pentode 15 and the primary of the speaker transformer shown at 16, energizing the speaker to produce a "tick" of appropriate sound for each pulse passed. The slider 100 may be adjusted along resistor 99 to regulate the output volume of speaker 16. Where a registering counter is substituted for the speaker, it is usually found desirable to have the current pulses in the anode circuit of pentode 15 of larger value than is necessary when the pulses are counted by an operator listening to the speaker 16.

What is claimed is:

1. A portable highly sensitive device for detecting radio activity and indicating the relative intensity thereof, comprising a Geiger-Mueller counter tube, means for generating and applying a high voltage to the electrodes of said tube, means for amplifying the output pulses from said tube resulting from repeated ionization occurring therein responsive to the receipt of radiation, means connected to said amplifying means for indicating the rate of receipt of said pulses, in which said means for generating a high voltage comprises a relaxation oscillator, an interrupter tube, a rectifier tube, a regulator tube, with batteries for energizing the same, in which the relaxation oscillator is connected to be energized by one of said batteries, means for applying voltage pulses derived from said relaxation oscillator to a control grid of said interrupter tube, means for connecting said inductance in the anode circuit of said interrupter tube, whereby current flow therein is interrupted under control of said relaxation oscillator, means for connecting the inductance to the rectifier tube whereby the high voltage pulses incident to the interruption of the current in said inductance are rectified, means for connecting the output of said rectifier tube through said filter to energize the Geiger-Mueller tube, and means for deriving a voltage from said rectifier tube proportional to its output voltage and for applying said derived voltage to the control grid of said regulator tube, the anode of said regulator tube being connected by suitable resistance to the end of said inductance opposite to that end connected to the anode of the interrupter tube.

2. A portable high voltage power supply for use in connection with devices for indicating radioactivity and the like, comprising a battery source of intermediate potential, means for generating oscillations, means controlled by the means for generating oscillations for intermittently starting and stopping current flow from said source of potential through an inductance, means for rectifying and filtering the instantaneous voltages across said inductance, means for deriving a component of voltage from said rectifier and applying the same to stabilize the value of successive voltage pulses across said inductance.

3. A highly sensitive portable battery energized radio-activity detecting device comprising a Geiger-Mueller counting tube, means for applying a high voltage to the electrodes of said Geiger-Mueller tube, means for amplifying the output pulses of said tube to a predetermined level, means for rectifying the pulses of predetermined level, means for applying a rectified voltage component of said pulses to a shunt connected condenser-resistance tank circuit, means for applying the voltages existing across said tank circuit to the input circuit of a vacuum tube translating means, and a micro-current responsive indicating instrument connected in the anode circuit of said vacuum tube translating means whereby the relative rate of receipt of pulses by said Geiger-Mueller tube is indicated by said instrument.

4. A device in accordance with claim 3 including a pulse input circuit independent of said Geiger-Mueller tube whereby pulses of known frequency may be injected for calibrating said indicating instrument to read pulse rates directly.

5. A device in accordance with claim 3 including a loud speaker and means for energizing said speaker responsive to said pulses.

6. A device in accordance with claim 3 in which the means for applying a high voltage to said Geiger-Mueller tube comprises a battery source of intermediate potential, means for generating relaxation oscillations, means controlled by the latter means for starting and stopping current flow from said source of potential through an inductance, means for rectifying and filtering the instantaneous voltages across said inductance, means for deriving a component of output voltage from said rectifier and applying the same to stabilize the value of the successive voltage pulses across said inductance.

H. CECIL SPICER.

REFERENCES CITED

The following references are of record in the file of this patent:

UNITED STATES PATENTS

| Number | Name | Date |
| --- | --- | --- |
| 2,206,123 | Rinia et al. | July 2, 1940 |
| 2,386,548 | Fogel | Oct. 9, 1945 |

OTHER REFERENCES

Locher and Weatherwax, Article in Radiology, 1936, pp. 154–156.

Huntoon, Article in Review of Scientific Instruments, June 1939, pp. 176 and 177.

Certificate of Correction

February 22, 1949.

Patent No. 2,462,140.    HERBERT CECIL SPICER

It is hereby certified that error appears in the printed specification of the above numbered patent requiring correction as follows:

Column 4, line 27, for the numeral "20" read *80*;

and that the said Letters Patent should be read with this correction therein that the same may conform to the record of the case in the Patent Office.

Signed and sealed this 2nd day of August, A. D. 1949.

[SEAL]

THOMAS F. MURPHY,
*Assistant Commissioner of Patents.*